(12) United States Patent
Jalloul et al.

(10) Patent No.: US 8,571,484 B2
(45) Date of Patent: *Oct. 29, 2013

(54) DETERMINING A HANDOFF METRIC

(75) Inventors: Louay Jalloul, Santa Clara, CA (US); Djordje Tujkovic, Santa Clara, CA (US); Anupama Lakshmanan, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,449

(22) Filed: Sep. 14, 2012

(65) Prior Publication Data

US 2013/0072191 A1  Mar. 21, 2013

Related U.S. Application Data

(63) Continuation of application No. 12/150,862, filed on May 1, 2008, now Pat. No. 8,295,775.

(51) Int. Cl.
*H04B 17/00* (2006.01)

(52) U.S. Cl.
USPC ......... 455/67.11; 455/434; 455/436; 455/437

(58) Field of Classification Search
USPC .......... 370/342, 496, 491; 455/424, 435, 436, 455/437, 434, 441, 442, 491, 500, 67.11
See application file for complete search history.

(56) References Cited

U.S. PATENT DOCUMENTS

| | | | |
|---|---|---|---|
| 5,101,501 A | | 3/1992 | Gilhousen et al. |
| 5,450,229 A | | 9/1995 | Wiesenfeld |
| 6,424,642 B1 * | | 7/2002 | Schmidl et al. ............... 370/342 |
| 6,744,987 B1 | | 6/2004 | Boytim et al. |
| 7,257,165 B2 | | 8/2007 | Gardner |
| 7,394,415 B2 * | | 7/2008 | Fuse et al. ..................... 341/120 |
| 2002/0021749 A1 | | 2/2002 | Lee et al. |
| 2002/0061731 A1 * | | 5/2002 | Takano et al. ................ 455/67.1 |
| 2005/0288020 A1 * | | 12/2005 | Cho et al. ...................... 455/436 |
| 2006/0094436 A1 * | | 5/2006 | Kim et al. ..................... 455/450 |

(Continued)

OTHER PUBLICATIONS

*Draft Standard for Local and metropolitan area networks—Part 16: Air Interface for Broadband Wireless Access System*, IEEE Draft Standard No. P802.16Rev2/D3, pp. i-lxviii and 1-1812 (Feb. 2008).

(Continued)

*Primary Examiner* — Hassan Phillips
*Assistant Examiner* — Ajay Cattungal
(74) *Attorney, Agent, or Firm* — Sterne, Kessler, Goldstein & Fox P.L.L.C.

(57) ABSTRACT

A method and apparatus of determining a hand-off metric are disclosed. One method includes a subscriber receiving identifications of a neighboring set of base stations from a serving base station, determining an active set of base stations by measuring received signal power from each of the base stations of the neighboring set at first discrete points in time, averaging the received signal power for each of these base stations, and selecting the active set based on the average received signal power. Determining the hand-off metric further includes calculating a ratio of average receive signal power to average excess received signal power, for each base station of the active set, wherein the excess received signal power includes signal power received by the subscriber in excess of power received from the base station.

20 Claims, 8 Drawing Sheets

(56) References Cited

U.S. PATENT DOCUMENTS

| | | | |
|---|---|---|---|
| 2008/0096568 A1* | 4/2008 | Jeong | 455/441 |
| 2008/0108353 A1* | 5/2008 | Lee et al. | 455/437 |
| 2009/0275335 A1 | 11/2009 | Jalloul et al. | |
| 2009/0275337 A1* | 11/2009 | Maeda et al. | 455/442 |
| 2010/0255833 A1* | 10/2010 | Ishii | 455/424 |
| 2012/0071181 A1* | 3/2012 | Guillouard et al. | 455/500 |

OTHER PUBLICATIONS

*WiMAX Forum™ Mobile System Profile Release 1.0 Approved Specification* (*Revision 1.4.0*: May 2, 2007), WiMAX Forum, pp. 1-90 IEEE, (Copyright 2006).

IEEE, Air Interface for Broadband Wireless Access Systems, Dec. 2007.

* cited by examiner

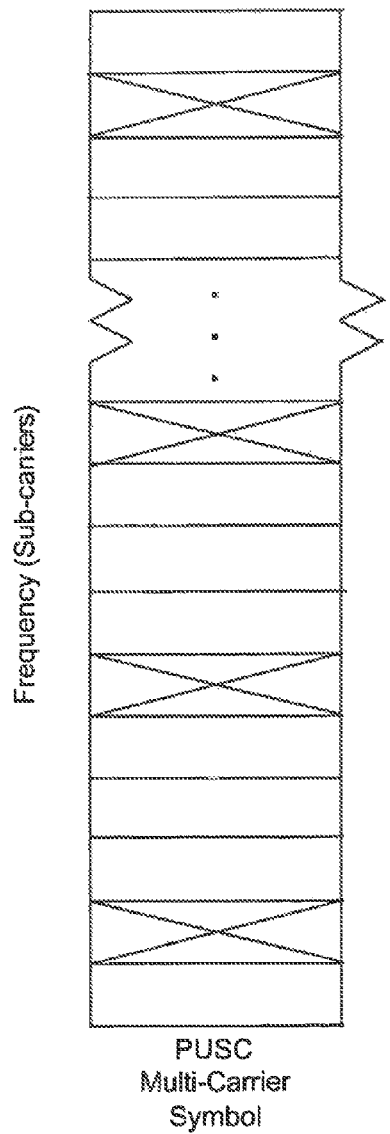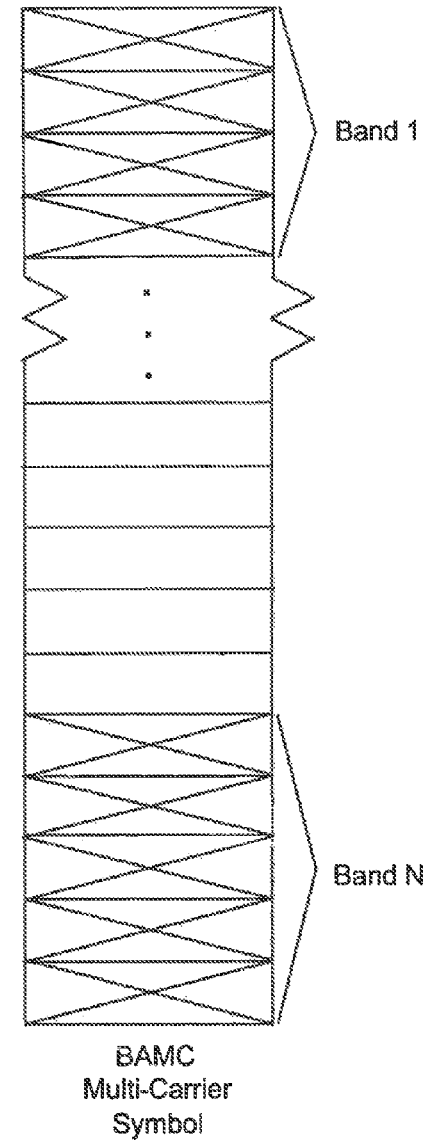
PUSC
Multi-Carrier
Symbol
FIGURE 3A
BAMC
Multi-Carrier
Symbol
FIGURE 3B

DETERMINING A HANDOFF METRIC

CROSS-REFERENCE TO RELATED APPLICATIONS

This application is a continuation of U.S. Non-Provisional application Ser. No. 12/150,862, filed May 1, 2008, entitled "Determining a Handoff Metric," which is incorporated by reference herein in its entirety.

FIELD OF THE INVENTION

The described embodiments relate generally to wireless communications. More particularly, the described embodiments relate to methods and systems for a subscriber unit determining a handoff metric.

BACKGROUND OF THE INVENTION

In a cellular wireless system, subscribers (users) typically move. As a result, each subscriber may be required to handoff from one base station to another in order to maintain acceptable wireless link quality between the subscriber and the wireless system. The link quality can vary from cell to cell, and within cells.

Subscribers located at the edges of the cells generally receive signals having substantially less signal carrier to interference-plus-noise ratio (CINR) than receivers located very close to a transmitting base station. Therefore, subscribers located close to the transmitters can typically support much higher data rates than subscribers located far away from the transmitters.

Some wireless systems (for example, WiMAX wireless systems) include multiple MCS (modulation and coding scheme). Ideally, the MCS is selected based at least in part on the quality of the wireless link. Additionally, multi-carrier systems, such as OFDM (orthogonal frequency division multiplexed), can vary scheduling of sub-carrier transmission based on, for example, frequency selectivity of the wireless link.

It is desirable to have a system and method for improved handoff selection, and transmission mode selection of a subscriber within a cellular wireless system.

BRIEF SUMMARY OF THE INVENTION

An embodiment includes a method of determining a handoff metric. The method includes a subscriber receiving a neighboring set of base station identifications from a serving base station. From the neighboring set, the subscriber determines an active set of base stations. The active set is determined by the subscriber measuring received signal power from each of the base stations of the neighboring set at first discrete points in time, averaging the received signal power for each of the base stations of the neighboring set, and selecting the active set based on the average received signal power of the base stations of the neighboring set. Determining the at least one hand-off metric further includes the subscriber measuring at second discrete points in time an excess received signal power for each base station of the active set, wherein the excess received signal power includes signal power received by the subscriber in excess of power received from the base station. The subscriber averages the excess received signal power. The subscriber calculates the hand-off metric by calculating a ratio of average receive signal power to average excess received signal power, for each base station of the active set.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS/FIGURES

FIG. 3A shows an example of multi-carrier symbols of transmission signal in a partial usage of sub-carriers mode.

FIG. 3B shows an example of multi-carrier symbols of transmission signal in an adjacent sub-carrier within band allocation mode.

DETAILED DESCRIPTION OF THE INVENTION

Embodiments for determining a handoff metric are disclosed. The embodiments include measuring a received signal power from each of multiple base stations, measuring received signal power in excess of each of the multiple base stations, and then estimating the handoff metric. The handoff metric can be used for aiding a mobile subscriber in selecting wireless connections with base stations of a wireless network.

Figure 1:
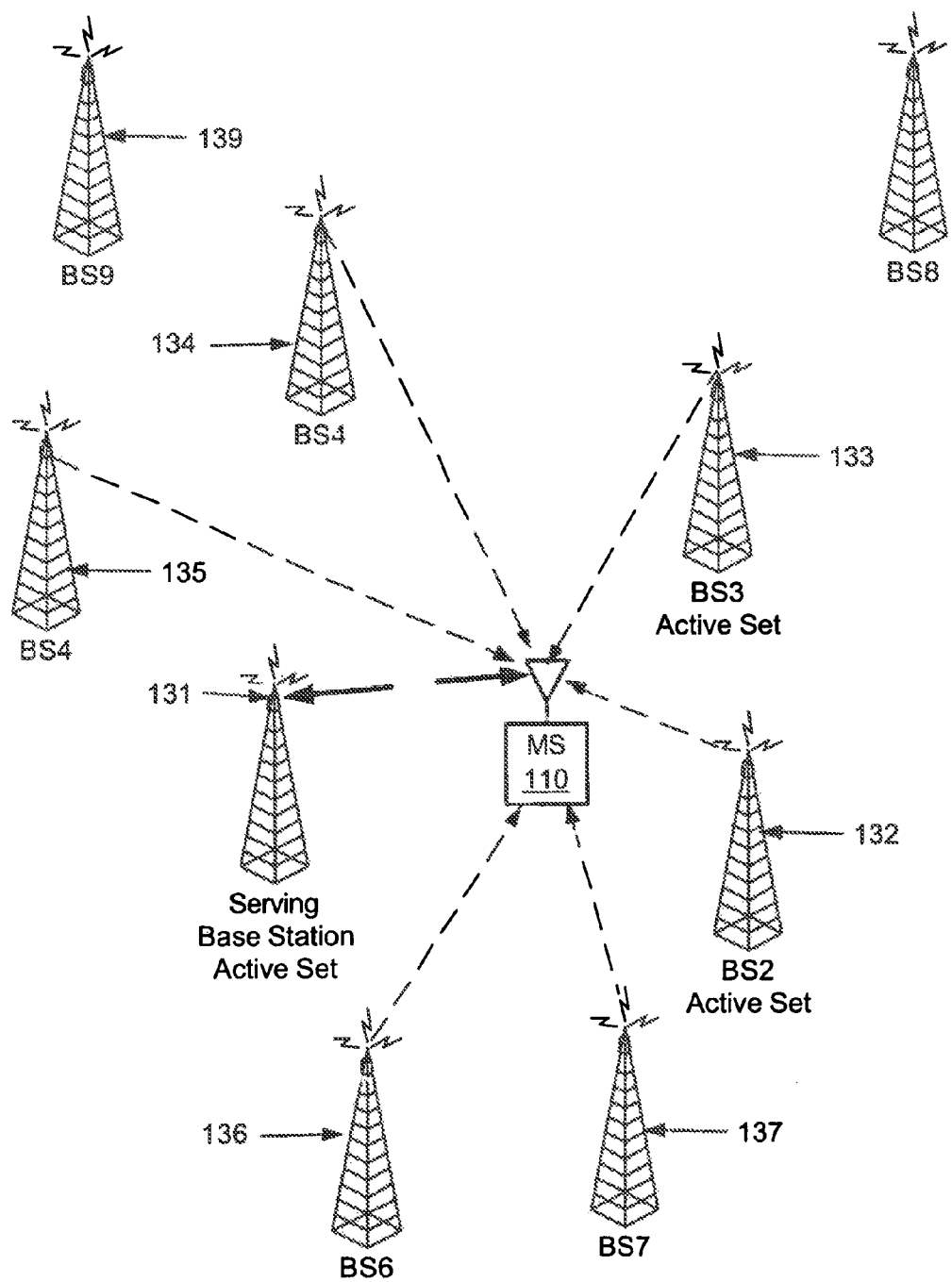
FIG. 1 shows an example of a wireless network that can utilize the described embodiments.

FIG. 1 shows an example of a wireless network that can utilize the described embodiments. A subscriber 110 receives wireless signals from at least one of multiple base stations 131, 132, 133, 134, 135, 136, 137, 138, 139. One of the base stations can be designated as the serving base station (for example, base station 131), and is generally the base station that the subscriber 110 is primarily maintaining communication.

The subscriber 110 can be any mobile computing devices, such as a laptop computer, personal digital assistant or mobile phone. The subscriber 110 is mobile, so the quality of the wireless links between the subscriber 110 and each of the base stations typically varies, for example, as the subscriber 110 physically moves relative to the stationary base stations.

As mentioned, the serving base station 131 is typically the base station that was at some point determined to be the base station having the best quality link with the subscriber 110. It is to be understood, however, that other criteria, such as, network loading can additionally or alternatively be used for selecting the serving base station. Considerations of what constitutes a best quality link can vary. However, one consideration that can be used is the signal power of signals received from the base stations. Another consideration includes an CINR (carrier to interference and noise ratio) of the signals received from the base stations. As noted, the subscriber 110 can change its location. Therefore, the serving base station can vary over time.

The subscriber can receive a neighboring list of base stations, for example, from the serving base station 131. The neighboring list of base stations generally includes the base stations that are proximate to the serving base station 131. For example, the neighboring set can include the base stations 131, 132, 133, 134, 135, 136, 137.

From the list of neighboring base stations, the subscriber 110 can select base stations that qualify as an active set of base stations. As will be described, one method of the subscriber 110 selecting the active set includes the subscriber 110 measuring received signal power from each of the base stations 131, 132, 133, 134, 135, 136, 137 of the neighboring set at first discrete points in time, the subscriber 110 averaging the received signal power for each of the base stations, and the subscriber selecting the active set based on the average received signal power of the base stations of the neighboring set. The active set can include, for example, the base stations 131, 132, 133.

As will be described, a handoff metric can be determined by a ratio of average received signal power to average power received in excess of the received signal power for each base station. Handoff and transmission selections and decisions can be based on the handoff metric of each base station.

Figure 2:
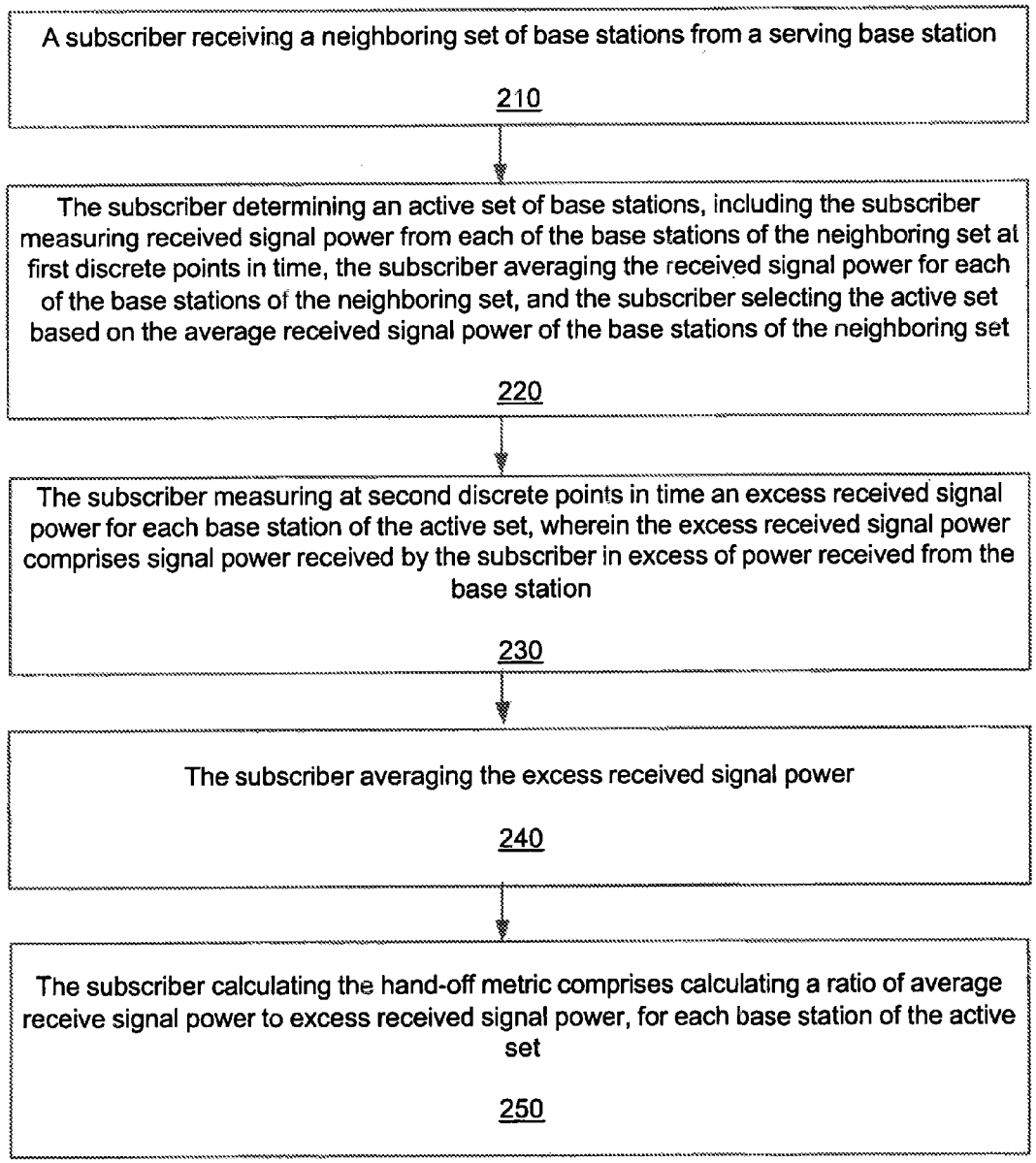
FIG. 2 is a flow chart that includes steps of an example of a method of determining a hand-off metric.

FIG. 2 is a flow chart that includes steps of an example of a method of determining a hand-off metric. A first step 210 includes a subscriber receiving identifications of a neighboring set of base stations from a serving base station. A second step 220 includes the subscriber determining an active set of base stations, including the subscriber measuring received signal power from each of the base stations of the neighboring set at first discrete points in time, the subscriber averaging the received signal power for each of the base stations of the neighboring set, and the subscriber selecting the active set based on the average received signal power of the base stations of the neighboring set. A third step 230 includes the subscriber measuring at second discrete points in time an excess received signal power for each base station of the active set, wherein the excess received signal power includes signal power received by the subscriber in excess of power received from the base.station. The excess power can include noise and interference. A fourth step 240 includes the subscriber averaging the excess received signal power. A fifth step 250 includes the subscriber calculating the hand-off metric by calculating a ratio of average receive signal power to excess received signal power, for each base station of the active set.

For an embodiment, the subscriber monitors the ratio of average receive signal power to excess received signal power, for each base station of the active set and attempts to maintain a wireless connection to the base station that has the highest ratio.

As the base station having the highest ratio changes as the mobile unit physically moves relative to the base stations, the subscriber unit initiates handoffs between the base stations in an attempt to maintain the link quality.

The averaging of the received signal powers over time provides advantages a compared to other method of determining handoff metrics that do not allow for time distribution of processing. More specifically, averaging the measurements and processing over time allows for a reduction in peak processing complexity. That is, the processing is spread or distributed over time. As will be described, some embodiments include interlacing the measurements and computation across frames which provides additional time spreading of the processing if needed or desired.

An embodiment includes the selecting a transmission mode. More specifically, two possible modes include a diversity allocation mode, and a multi-user/opportunistic mode. For WiMAX, for example, the mode selection can include selecting between the subscriber transmitting in a partial usage of sub-carriers mode (PUSC) or an adjacent sub-carrier allocation mode (BAMC) based on the hand-off metric. That is, this embodiment includes that handoff metric being used for selection of a transmission mode.

The partial usage of sub-carriers transmission mode is sometimes referred to as a PUSC (partial usage of sub-carriers) mode. The PUSC mode includes a distribution of sub-carriers of a multi-carrier symbol (such as, OFDM (orthogonal frequency division multiplexing)) for transmission.

FIG. 3A shows an example of multi-carrier symbols of transmission signal in a partial usage of sub-carriers mode. As shown, the sub-carriers are distributed over frequency, providing frequency diversity.

The adjacent sub-carrier allocation mode is sometimes referred to as the BAMC mode. The BAMC mode includes selection of a band of sub-carriers of a multi-carrier symbols (such as, OFDM). A BAMC selection additionally be motivated by opportunistic scheduling.

FIG. 3B shows an example of multi-carrier symbols of transmission signal in an adjacent sub-carrier allocation mode.

An embodiment includes selecting between using PUSC versus BAMC by ensuring the handoff metric computed by the subscriber exceeds a threshold, wherein the threshold is broadcasted by the base station, and is a function of several parameters available at the base station.

Figure 4:
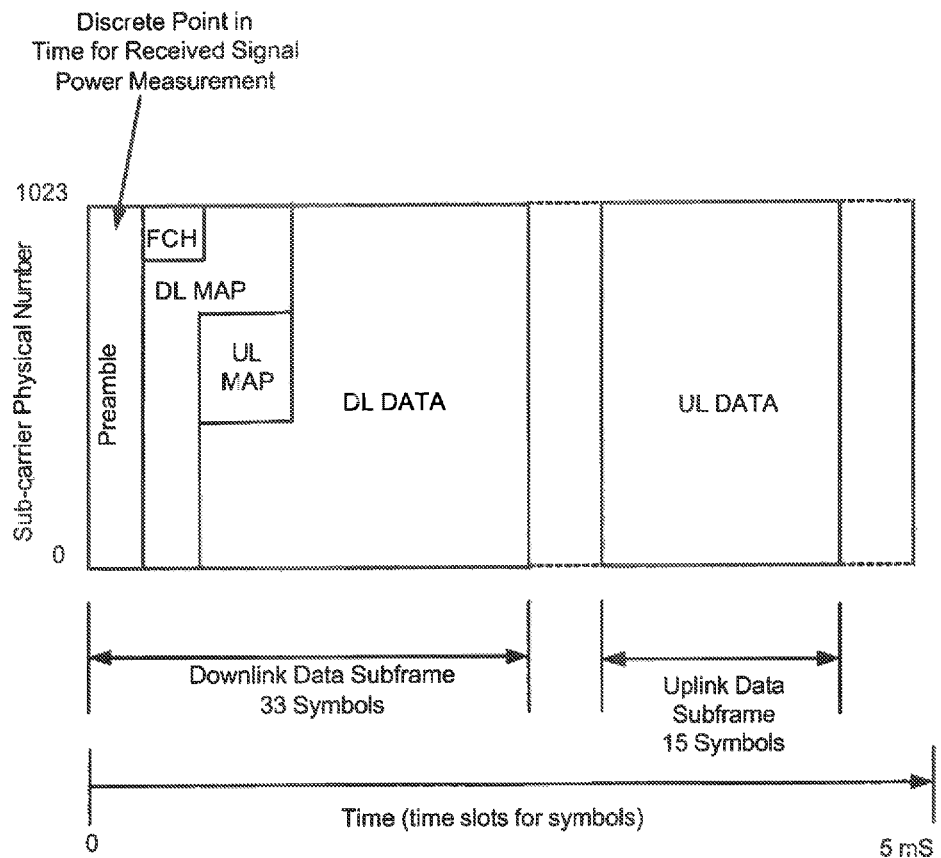
FIG. 4 shows a downlink frame of a wireless signal that includes identifiable discrete points in time for measuring received signal power.

FIG. 4 shows a downlink frame of a wireless signal that includes identifiable discrete points in time for measuring received signal power. The downlink frame can be structured according, for example, the WiMAX standard. One embodiment includes the subscriber measuring receive signal power, and/or excess received power during the preamble of the downlink frame. The preamble is a set of known pilot tones across the entire frequency spectrum of a given OFDM symbol.

Each downlink frame includes a preamble, and therefore, the preambles provide a periodic time for measuring the received signal power. It should be noted that each base station of the wireless cells can be identified by its corresponding PRBS (pseudo random bit sequence).

One embodiment includes all of the base stations of the neighboring set and/or active set being measured every frame. Another embodiment includes the received signal power of the neighboring set being measured once every K frames, and the received signal power of the active set being measured once every J frames. An embodiment includes K being equal to J.

Figure 5:
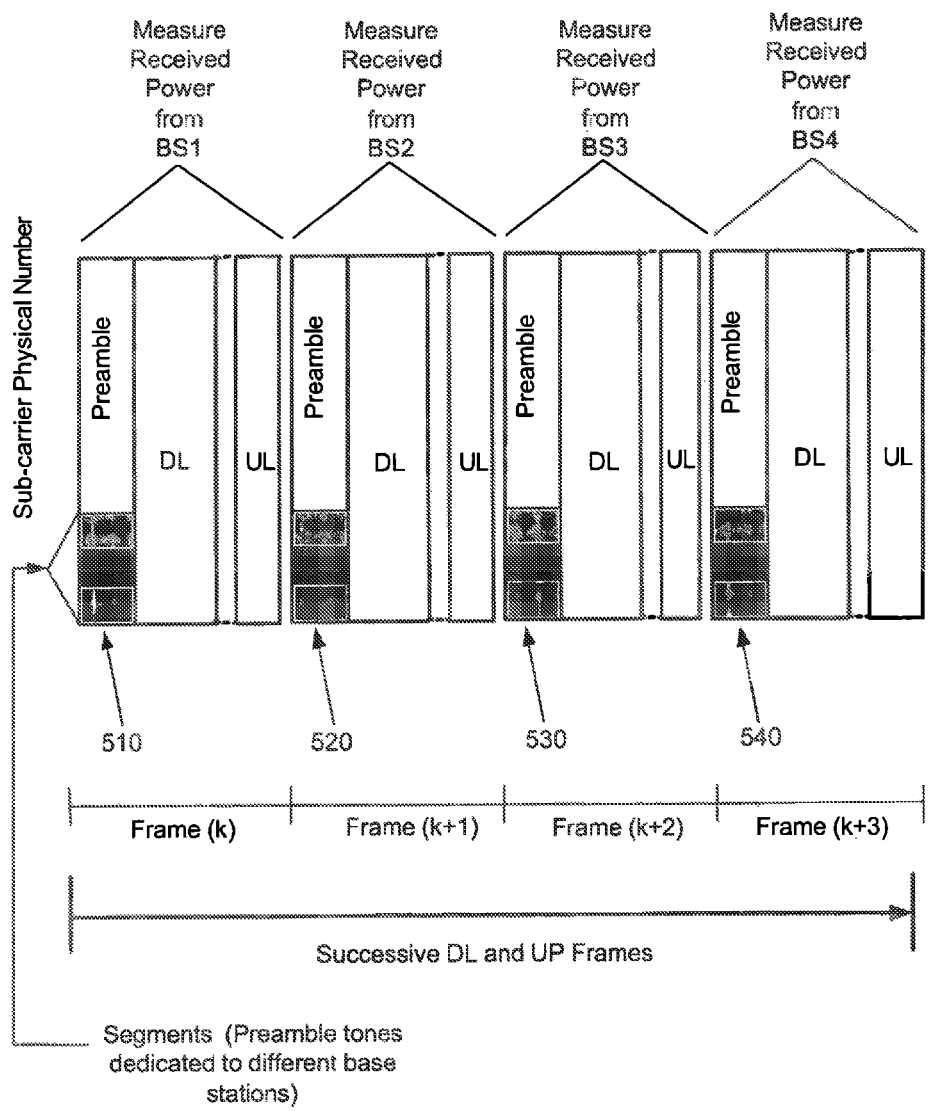
FIG. 5 shows an example of multiple downlink frames that include interlacing of received signal power measurements from multiple base stations.

FIG. 5 shows an example of multiple downlink frames (k through k+3) 510, 520, 530, 540 that include interlacing of received signal power measurements. That is, each frame defines a determined point in time for measuring a received signal from a designated base station. That is, the frame (k) 510 can be designated for measurement of received signal power from the base station (BS1) 131, the frame (k+1) 520 can be designated for measurement of received signal power from base station (BS2) 132, the frame 530 can be designated for measurement of received signal power from base station (BS3) 133 and the frame 540 can be designated for measurement of received signal power from the base station 134. As shown, the received signal power measurements of the different base station are "time interleaved". It should be noted that while FIG. 5 shows the received signal measurements of the three different base stations occurring at different frames, other received signal measurement of other base station can also be made at each of the different frames. That is, for example, along with BS1, received signal power of a signal from a BS4 can be measured at frame (k) 510, and along with BS2, received signal power of a signal from a BS5 can be measured at frame (k+1) 520.

The three blocks at the lower portions of the preamble designate segments, wherein each segment defines an allocation of, for example, preamble sub-carriers allocated to particular base stations. That is, as shown, every third sub-carrier is allocated to one of three base stations (or cell sectors). The subscriber knows to measure the received signal power of the three base stations based on the allocated sub-carriers of the preamble multi-carrier symbol. In other words, the preamble of the example shown includes a frequency reuse of 3. This is standard in WiMAX, but can vary for different wireless systems. Embodiments include signal power measurements of one or more base station being made per frame.

A determination of Doppler frequency can be used to dictate the size of the time intervals between the discrete points in time for received signal power measurements. The Doppler frequency provides an indication of how fast the quality of the wireless links between the subscriber unit and the base station are changing. The Doppler frequency can provide, for example, an indication of the rate of change of the position of the subscriber unit relative to the base stations. Generally, the rate the quality, of the wireless links varies is a reasonable indicator of how frequently the handoff metric should be calculated. An embodiment includes selecting the rate of the received signal power measurements based on the Doppler frequency.

Embodiments of the subscriber determining the Doppler frequency includes computing complex correlations of the multi-carrier symbols over time. That is, for example, a received pilot from a symbol can be compared with a pilot of the same sub carrier of another symbol that occurs later in time. An average of the complex correlation between the pilot symbols can be calculated, wherein the phase of the average complex correlation provides an indication of the Doppler frequency.

As previously described, the received signal power of one of multiple base stations can be measured once per some predetermined number of frames. The number of frames included within the predetermined number can be adapted based on the Doppler frequency. Alternatively, all of base stations of, for example, the active set can be measured once per the predetermined number of frames, wherein the number of frames of the predetermined number is adapted base on the Doppler frequency.

Figure 6:
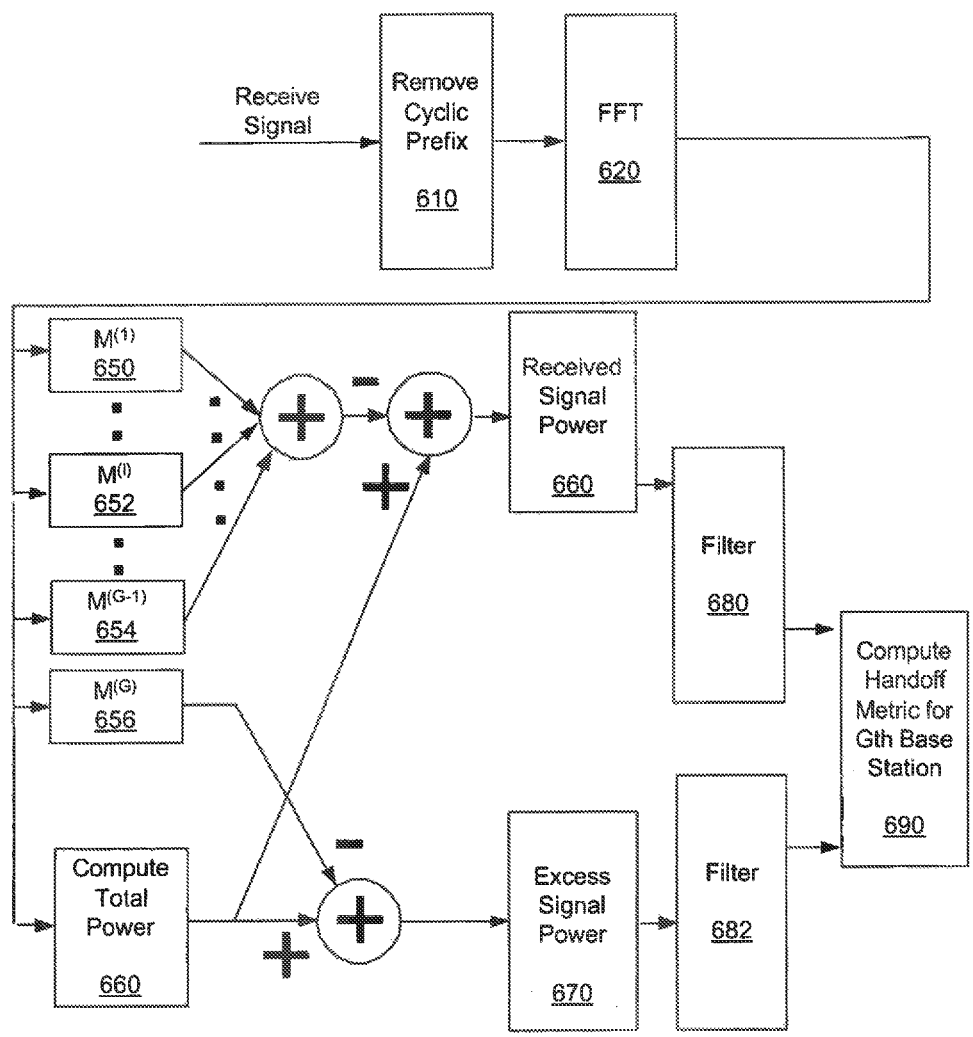
FIG. 6 shows an example of a block diagram of an embodiment for measuring received signal power, excess power and handoff metric.

FIG. 6 shows an example of a block diagram of an embodiment for measuring received signal power, excess power and handoff metric. This embodiment is specific to a multi-carrier system, such as, OFDM. This embodiment includes a block 610 for removing a cyclic prefix from the received time domain symbols. An FFT 620 transforms the time domain symbols into the frequency domain. The frequency domain symbols are processed to generate received signal correlation indicators for each base station. As shown in FIG. 6, G base stations generate G received signal correlation indicators $M^{(1)} \ldots M^{(i)} \ldots M^{(G-I)} \ldots M^{(G)}$ shown by blocks 650, 652, 654, 656. Outputs of the G received signal correlation indicators are summed. The summed correlation indicators are subtracted from a computed total power 650. Outputs of the summers allow for calculations of the received signal power 660, and the excess signal power 670. The received signal power and the excess signal power are averaged by filters 680, 682 to produce the average received signal power and the average excess received signal power. The handoff metric calculated at block 690 by calculating the ratio of the average received signal power to the average excess received signal power.

Figure 7:
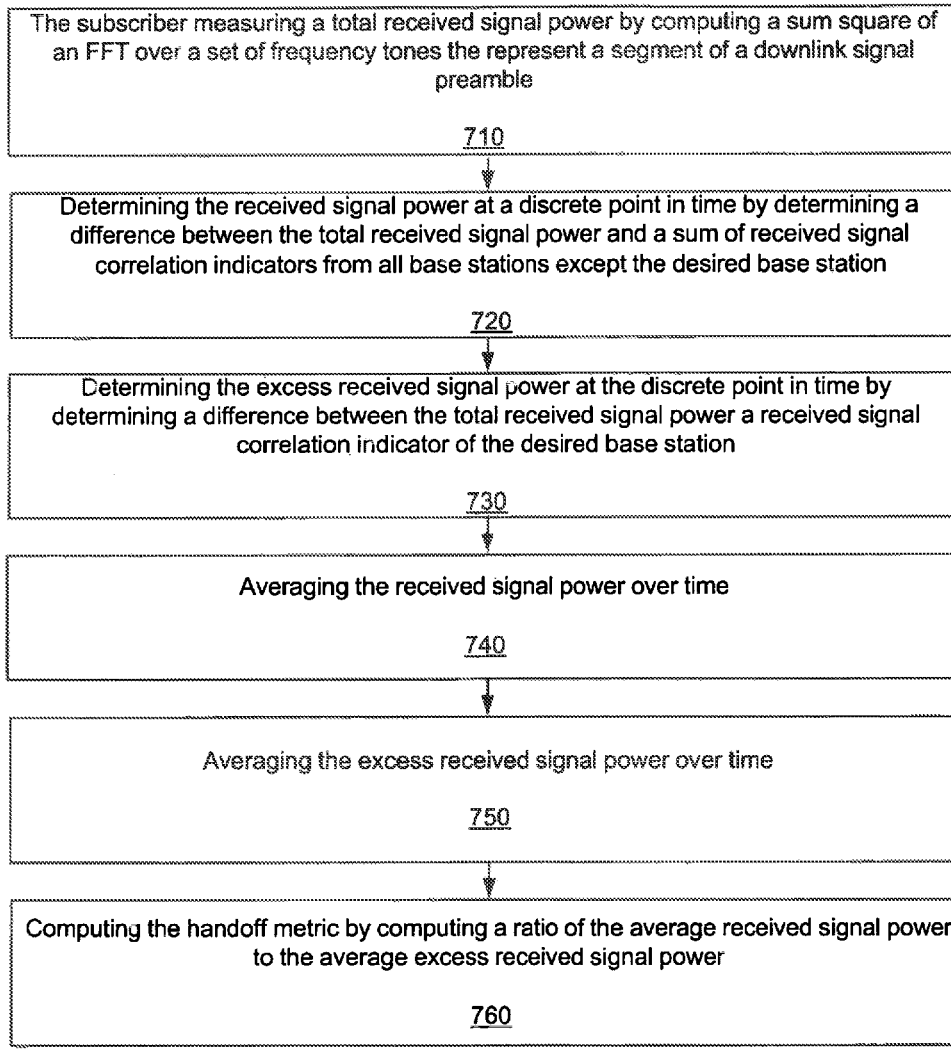
FIG. 7 is a flow chart that shows an example of steps of a method for determining a handoff metric from an active set.

FIG. 7 is a flow chart that shows an example of steps of a method for determining a handoff metric from an active set. A first step 710 of the method includes the subscriber measuring a total received signal power by computing a sum square of an FFT over a set of frequency tones the represent a segment of a downlink signal preamble. A second step 720 includes determining the received signal power at a discrete point in time by determining a difference between the total received signal power and a sum of received signal correlation indicators from all base stations except the desired base station (the $M^{(G)}$ of the Gth base station of FIG. 6). A third step 730 includes determining the excess received signal power at the discrete point in time by determining a difference between the total received signal power a received signal correlation indicator of the desired base station. A fourth step 740 includes averaging the received signal power over time. A fifth step 750 includes averaging the excess received signal power over time. A sixth step 760 includes computing the handoff metric by computing a ratio of the average received signal power to the average excess received signal power.

A mathematical description of, for example, the embodiment of FIG. 7, is given by the output of the FFT (after the removal of the cyclic prefix from the baseband signal) for the preamble on a given segment, $$Y_j = \sum_{g=1}^{G} h_j^{(g)} c_j^{(g)} + n_j, \ j = 1, 2, \ldots, N$$

where
$Y_j$: denotes a received signal;
$c_j^{(g)}$: denotes the pseudo-random binary sequence (PRBS) used for the g-th BS,
$h_j^{(g)}$: denotes the g-th BS frequency response on the j-th sub-carrier,
G: denotes the number of BS on that segment,
N: denotes the number of sub-carriers in the preamble segment,
$n_j$: denotes the thermal noise, zero-mean and variance $\sigma_n^2$ Without loss of generality the system model applies to any one of, for example, 3 segments. The ratio of average received signal to average excess received signal power processing can be done on, for example, all 3 segments of a WiMAX cell.

The subscriber generally measures the received signal power signal and excess received signal power on a different segment than the base station it is communicating with. Therefore, there is a frequency offset between the subscriber and the base station. Therefore, a pair-wise correlation can be used to obtain estimates of the desired and the interfering base station signals' powers.

For the desired signal, first the PRBS is removed (de-PRBS) from the FFT output, to derive a first sequence denoted as:

$$D_j^{(i)} = Y_j c_j^{(i)}, j=1,2,\ldots,N, i=1,2,\ldots,G$$

Next, a second sequence is defined as a shifted version of the first sequence by a single tone, i.e.

$$T_j^{(i)} = D_{j+1}^{(i)}, j=1,\ldots,N-1, i=1,2,\ldots,G$$

Then, an inner product of the first and second sequence is computed to obtain a measurement of a BS received signal correlation indicator, $$M^{(i)} = \sum_{j=1}^{N-1} D_j^{(i)} T_j^{(i)*}, i = 1, 2, \ldots, G$$

The computation can be alternatively described as an evaluation of an autocorrelation at a single tone shift.

At least some of the described embodiments estimate the handoff metric for the i-th BS as:

Handoff Metric $i^{th}$ BS =

$$\frac{\text{average received signal power}}{\text{average excess signal power}} = \frac{E\left[P_T - \sum_{g=1,g \neq i}^{G} M^{(g)}\right]}{E[P_T - M^{(i)}]}$$

where $P_T$ is the total received power is given by $$P_T = \sum_{j=1}^{N-1} |Y_j|^2$$

Figure 8:
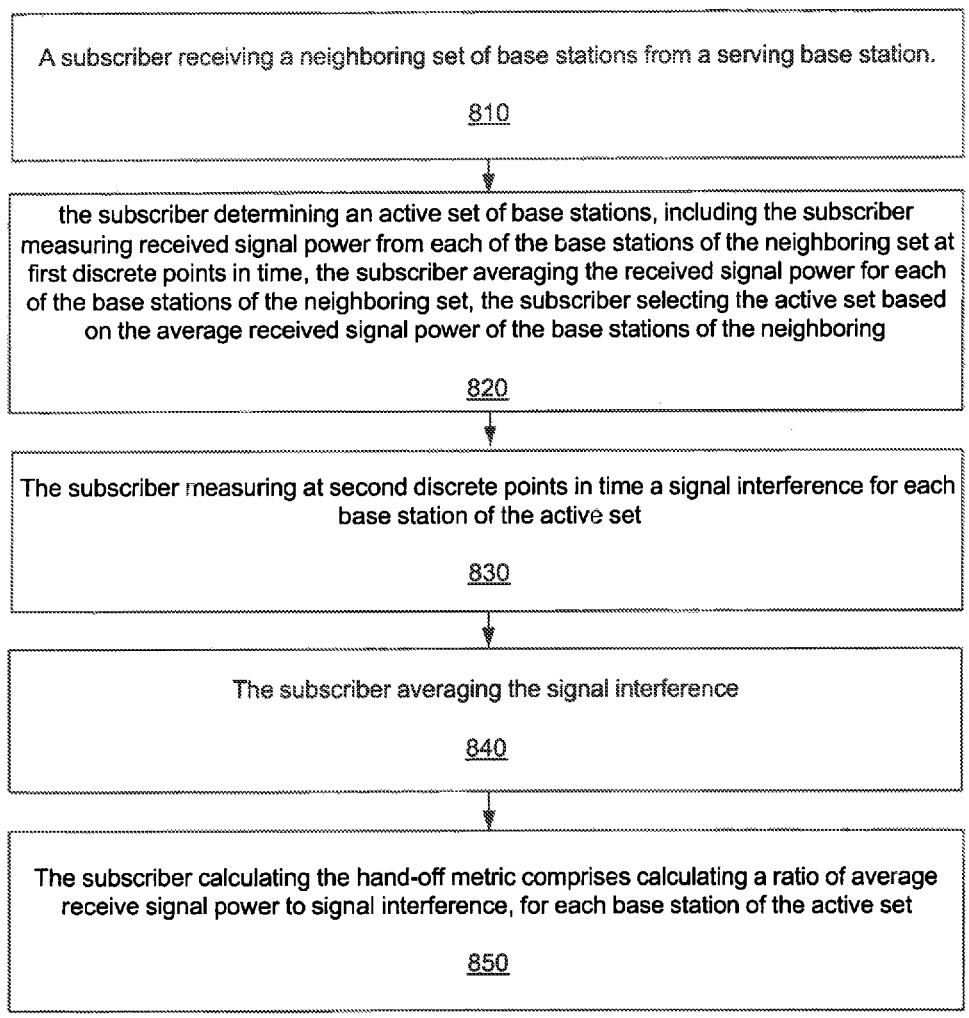
FIG. 8 is a flow chart that includes steps of another example of a method of determining a hand-off metric.

FIG. 8 is a flow chart that includes steps of another example of a method of determining a hand-off metric. A first step 810 includes a subscriber receiving a neighboring set of base stations from a serving base station. A second step 820 includes the subscriber determining an active set of base stations, including the subscriber measuring received signal power from each of the base stations of the neighboring set at first discrete points in time, the subscriber averaging the received signal power for each of the base stations of the neighboring set, the subscriber selecting the active set based on the average received signal power of the base stations of the neighboring. Determining the at least one hand-off metric further includes a third step 830 that includes the subscriber measuring at second discrete points in time a signal interference for each base station of the active set. A fourth step 840 includes the subscriber averaging the signal interference. A fifth step 850 includes the subscriber calculating the hand-off metric comprises calculating a ratio of average receive signal power to signal interference, for each base station of the active set.

Although specific embodiments of the invention have been described and illustrated, the disclosed embodiments are not to be limited to the specific forms or arrangements of parts so described and illustrated. The disclosed embodiments are limited only by the appended claims.

What is claimed is:

1. An apparatus for determining a hand-off metric, comprising:
a mobile station configured to:
determine an active set of base stations by:
measuring received signal power from each base station of a neighboring set of base stations at first discrete points in time,
averaging the received signal power for each of the base stations of the neighboring set, and
selecting the active set based on the average received signal power of the base stations of the neighboring set;
measure, at second discrete points in time, an excess received signal power for each base station of the active set, wherein the excess received signal power comprises signal power received in excess of power received from the base station;
average the excess received signal power; and
determine the hand-off metric by calculating a ratio of average receive signal power to average excess received signal power, for each base station of the active set.

2. The apparatus of claim 1, wherein the mobile station is further configured to select a transmitting mode based on the hand-off metric, wherein the transmitting mode is one of a partial usage of sub-carriers mode and an adjacent sub-carrier within band allocation mode.

3. The apparatus of claim 1, wherein at least one of the first discrete points in time and the second discrete points in time are determined discrete points in time.

4. The apparatus of claim 3, wherein the determined discrete points in time are based on occurrences of preamble symbols of signals received from the active set of base stations.

5. The apparatus of claim 3, wherein the determined discrete points in time are based on occurrences of downlink frames of signals received from the active set of base stations.

6. The apparatus of claim 3, wherein the determined discrete points in time occur at a rate that is dependent on a Doppler frequency measured by the mobile station.

7. The apparatus of claim 6, wherein the rate increases as the Doppler frequency increases, and the rate decreases as the Doppler frequency decreases.

8. The apparatus of claim 1, wherein the first discrete points in time and the second discrete points in time are determined discrete points in time that are substantially the same.

9. The apparatus of claim 1, wherein the mobile station is further configured to interlace the measurements of the received signal power from the base stations in the neighboring set.

10. The apparatus of claim 9, wherein the mobile station configuration to interlace the measurements of the received signal power from the base stations in the neighboring set includes being configured to time interleave the received signal power measurements of the base stations in the neighboring set.

11. The apparatus of claim 9, wherein the mobile station configuration to interlace the measurements of the received signal power from the base stations in the neighboring set includes being configured to periodically cycle the received signal power measurements of the base stations in the neighboring set.

12. The apparatus of claim 1, wherein the mobile station is further configured to interlace the measurements of the excess received signal power for the base stations in the active set.

13. The apparatus of claim 1, wherein the mobile station configuration to select the active set includes being configured to select the active set based on a relative variation of the average received signal power.

14. The apparatus of claim 1, wherein the mobile station configuration to select the active set includes being configured to select the active set based on absolute average received signal power.

15. The apparatus of claim 1, wherein the mobile station configuration to select the active set includes being configured to select the active set based on the average received signal power exceeding a threshold.

16. The apparatus of claim 1, wherein the mobile station configuration to average the received signal power and average the excess received signal power includes being configured to at least one of IIR and FIR filter the received signal power and the excess received signal power.

17. The apparatus of claim 1, wherein the mobile station is further configured to identify one or more base stations in the neighboring set based on corresponding PRBS (pseudo random bit sequences).

18. The apparatus of claim 1, wherein the mobile station is further configured to:
 measure a total received signal power by computing a sum square of an FFT (Fast Fourier Transform) over a set of frequency tones that represent a segment of a downlink signal preamble;
 determine the received signal power at a discrete point in time by determining a difference between the total received signal power and a sum of received signal correlation indicators from all base stations except a desired base station;
 determine the excess received signal power at the discrete point in time by determining a difference between the total received signal power and a received signal correlation indicator associated with the desired base station;
 average the received signal power over time;
 average the excess received signal power over time; and
 compute a hand-off metric associated with the desired base station by computing a ratio of the average received signal power to the average excess received signal power.

19. An apparatus for determining a hand-off metric, comprising:
 a mobile station configured to:
  determine an active set of base stations by:
   measuring received signal power from each base station of a neighboring set of base stations at first discrete points in time,
   averaging the received signal power for each of the base stations of the neighboring set, and
   selecting the set based on the average received signal power active of the base stations of the neighboring set;
  measure, at second discrete points in time, a signal interference for each base station of the active set;
  average the signal interference; and
  determine the hand-off metric by calculating a ratio of average receive signal power to signal interference, for each base station of the active set.

20. The apparatus of claim 19, wherein the mobile station is further configured to:
 measure a total received signal power by computing a sum square of an FFT (Fast Fourier Transform) over a set of frequency tones that represent a segment of a downlink signal preamble;
 determine the received signal power at a discrete point in time by determining a difference between the total received signal power and a sum of received signal correlation indicators from all base stations except a desired base station;
 determine the signal interference at the discrete point in time by determining a difference between the total received signal power and received signal correlation indicator associated with the desired base station;
 average the received signal power over time;
 average the signal interference given over time; and
 compute a hand-off metric associated with the desired base station by computing a ratio of the average received signal power to the average interference.

* * * * *

UNITED STATES PATENT AND TRADEMARK OFFICE
CERTIFICATE OF CORRECTION

| | | |
|---|---|---|
| PATENT NO. | : 8,571,484 B2 | Page 1 of 1 |
| APPLICATION NO. | : 13/620449 | |
| DATED | : October 29, 2013 | |
| INVENTOR(S) | : Jalloul et al. | |

It is certified that error appears in the above-identified patent and that said Letters Patent is hereby corrected as shown below:

Title Page, item (57), ABSTRACT, line 10, "ratio of average receive signal" should be replaced with --ratio of average received signal--.

In the Specification:

Column 3, Line 4, "a neighboring list of" should be replaced with --a list of neighboring--.

Column 3, Line 6, "a neighboring list of" should be replaced with --a list of neighboring--.

In the Claims:

Column 8, Line 11, "average receive signal power" should be replaced with --average received signal power--.

Column 10, Lines 6-7, "selecting the set based on the average received signal power active of" should be replaced with --selecting the active set based on the average received signal power of--.

Column 10, Line 13, "average receive signal power" should be replaced with --average received signal power--.

Column 10, Line 28, "power and received signal" should be replaced with --power and a received signal--.

Signed and Sealed this
Eleventh Day of February, 2014

Michelle K. Lee
*Deputy Director of the United States Patent and Trademark Office*